(12) United States Patent
Sanders

(10) Patent No.: US 12,287,157 B1
(45) Date of Patent: Apr. 29, 2025

(54) METHOD OF HEAT EXCHANGER ASSEMBLY

(71) Applicant: Leon Sanders, Auburn, WA (US)

(72) Inventor: Leon Sanders, Auburn, WA (US)

( * ) Notice: Subject to any disclaimer, the term of this patent is extended or adjusted under 35 U.S.C. 154(b) by 222 days.

(21) Appl. No.: 17/881,602

(22) Filed: Aug. 5, 2022

Related U.S. Application Data

(60) Provisional application No. 63/256,635, filed on Oct. 18, 2021.

(51) Int. Cl.
*F28D 7/10* (2006.01)
*B23P 15/26* (2006.01)

(52) U.S. Cl.
CPC ............ *F28D 7/10* (2013.01); *B23P 15/26* (2013.01); *F28F 2275/045* (2013.01)

(58) Field of Classification Search
CPC ........ B23P 15/26; F28D 7/10; F28F 2275/045
USPC ............... 29/890.054, 890.03; 252/262.1
See application file for complete search history.

(56) References Cited

U.S. PATENT DOCUMENTS

| | | | | |
|---|---|---|---|---|
| 304,092 | A * | 8/1884 | Francke | B01D 11/0223 162/58 |
| 1,420,182 | A * | 6/1922 | Cleveland | F22B 13/06 228/183 |
| 2,157,918 | A * | 5/1939 | Rankin | B23K 35/3006 285/289.1 |
| 2,520,821 | A * | 8/1950 | Woods | F28F 9/22 165/160 |
| 2,528,040 | A * | 10/1950 | Crouch | B23K 1/20 285/288.11 |
| 2,618,846 | A * | 11/1952 | Morris | C23C 26/02 29/890.038 |
| 2,732,615 | A * | 1/1956 | Sandberg | B21D 53/08 29/890.038 |
| 3,349,465 | A * | 10/1967 | La Pan | F22G 3/009 228/183 |

(Continued)

FOREIGN PATENT DOCUMENTS

| | | | | |
|---|---|---|---|---|
| DE | 102007032211 A1 * | 1/2009 | | B23K 1/0012 |
| DE | 102008021544 B4 * | 3/2012 | | B21D 53/085 |

(Continued)

OTHER PUBLICATIONS

"Paint Fluxing—Pros and Cons, Part 2", Aluminium Brazing. [online], [retrieved on Mar. 6, 2025]. Retrieved from the Internet <URL: ttps://www.aluminium-brazing.com/2012/11/30/paint-fluxing-pros-and-cons-part-2/>, Nov. 30, 2012. (Year: 2012).*

*Primary Examiner* — Ljiljana V. Ciric
(74) *Attorney, Agent, or Firm* — Joseph Z. Ellsworth

(57) ABSTRACT

A method for heat exchanger construction includes inserting a plurality of tubes through corresponding apertures in a first tube sheet and inserting the plurality of tubes through corresponding apertures in a second tube sheet. Brazing material is injected into a fill channel in the first tube sheet and then the heat exchanger is heated to a melting temperature of the brazing material. The tube and shell heat exchanger has a plurality of tubes coupled within apertures in a first tube sheet and apertures in a second tube sheet. Brazing material inserted through a fill channel in the first tube sheet forms a brazed joint between the tubes and tube sheets.

12 Claims, 7 Drawing Sheets

(56) References Cited

U.S. PATENT DOCUMENTS

| | | | | |
|---|---|---|---|---|
| 3,421,577 A * | 1/1969 | Valyi | B21D 53/045 | 165/170 |
| 3,498,807 A * | 3/1970 | Gresham | C04B 28/26 | 106/636 |
| 3,572,770 A * | 3/1971 | Kagi | F28F 9/08 | 285/139.2 |
| 3,710,473 A * | 1/1973 | McElwain | B21D 53/085 | 29/890.038 |
| 4,028,789 A * | 6/1977 | Loch | B21D 39/042 | 29/421.2 |
| 4,044,443 A * | 8/1977 | Chartet | F28D 1/053 | 165/173 |
| 4,347,965 A * | 9/1982 | Grossman | F24S 10/753 | 29/890.038 |
| 4,605,157 A * | 8/1986 | Barr | B23P 15/28 | 228/245 |
| 4,711,144 A * | 12/1987 | Barr | E21B 10/62 | 228/139 |
| 5,027,495 A * | 7/1991 | Usui | F16L 3/12 | 403/243 |
| 5,129,144 A * | 7/1992 | Halstead | B60H 1/3227 | 29/890.035 |
| 5,149,490 A * | 9/1992 | Brown | G21C 1/09 | 376/307 |
| 5,150,520 A * | 9/1992 | DeRisi | F28F 9/182 | 228/183 |
| 5,467,528 A * | 11/1995 | Bales | F28F 3/14 | 29/890.038 |
| 5,617,992 A * | 4/1997 | Huddleston | F28F 9/182 | 228/183 |
| 5,622,220 A * | 4/1997 | Park | F28F 9/02 | 165/149 |
| 5,639,361 A * | 6/1997 | Humke | C09D 163/00 | 524/591 |
| 5,711,369 A * | 1/1998 | Huddleston | | 228/183 |
| 6,552,294 B1 * | 4/2003 | Ananthanarayanan | B23K 11/002 | 219/59.1 |
| 6,557,255 B2 * | 5/2003 | Billmyer | F16L 41/001 | 29/890.032 |
| 7,297,908 B2 * | 11/2007 | Yoshida | B23P 11/025 | 29/426.4 |
| 7,726,024 B2 * | 6/2010 | Ishii | F28F 9/18 | 29/890.038 |
| 7,895,749 B2 * | 3/2011 | Eto | F28F 3/025 | 29/890.053 |
| 7,996,990 B2 * | 8/2011 | Tsuji | B21D 53/08 | 29/890.047 |
| 8,002,167 B2 * | 8/2011 | Zuber | B23K 9/0286 | 228/168 |
| 8,726,507 B2 * | 5/2014 | Bajusz | F28D 1/0308 | 29/890.039 |
| 8,740,041 B2 * | 6/2014 | Visser | B23P 13/04 | 72/274 |
| 8,978,962 B2 * | 3/2015 | Garcia-Juan | B23K 35/3605 | 148/23 |
| 10,962,302 B2 * | 3/2021 | Victor | C10G 35/24 | |
| 2003/0173720 A1 * | 9/2003 | Musso | H01L 21/4871 | 257/E23.099 |
| 2006/0219398 A1 * | 10/2006 | Eto | F28D 1/0391 | 165/173 |
| 2011/0011572 A1 * | 1/2011 | Nagurny | F28F 21/084 | 165/172 |
| 2014/0008417 A1 * | 1/2014 | Visser | B23K 35/0222 | 228/56.3 |
| 2014/0262173 A1 * | 9/2014 | Nagurny | F28D 7/16 | 29/890.038 |

FOREIGN PATENT DOCUMENTS

| | | | | |
|---|---|---|---|---|
| ES | 2870501 T3 * | 10/2021 | | F28D 7/16 |
| JP | 63006394 A * | 1/1988 | | |
| KR | 102141900 B1 * | 8/2020 | | |
| WO | WO-9850748 A1 * | 11/1998 | | F28F 9/0217 |
| WO | WO-2013008975 A1 * | 1/2013 | | B23K 1/20 |

* cited by examiner

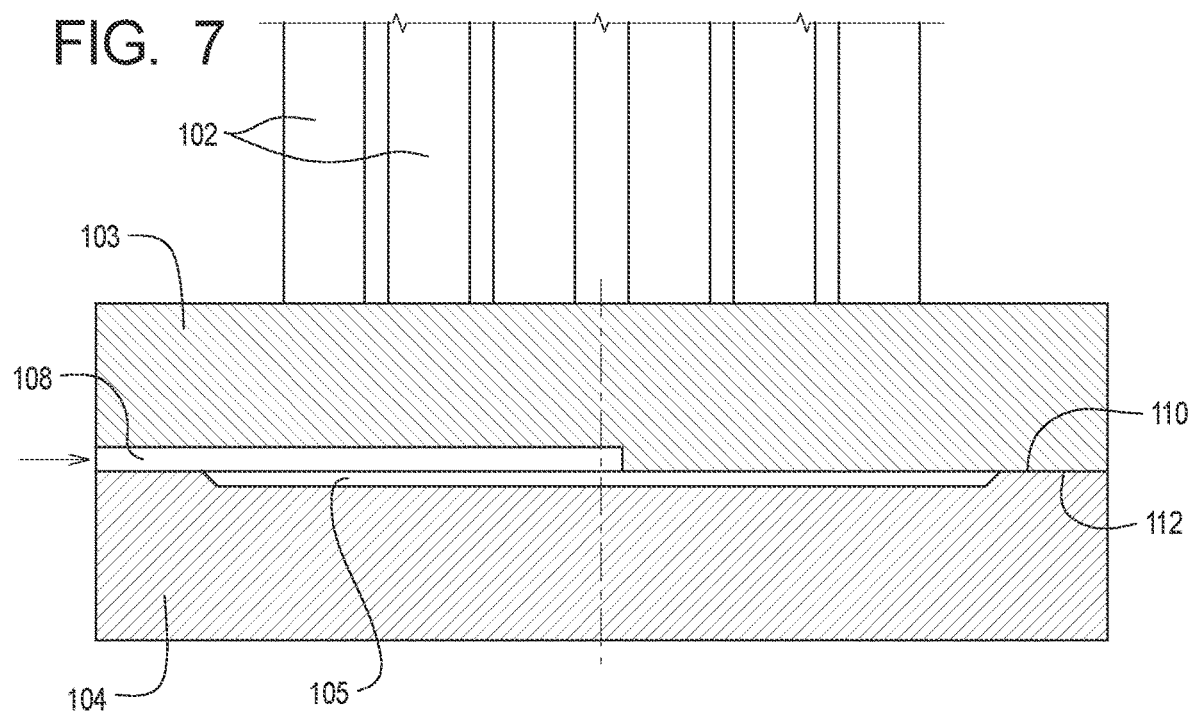
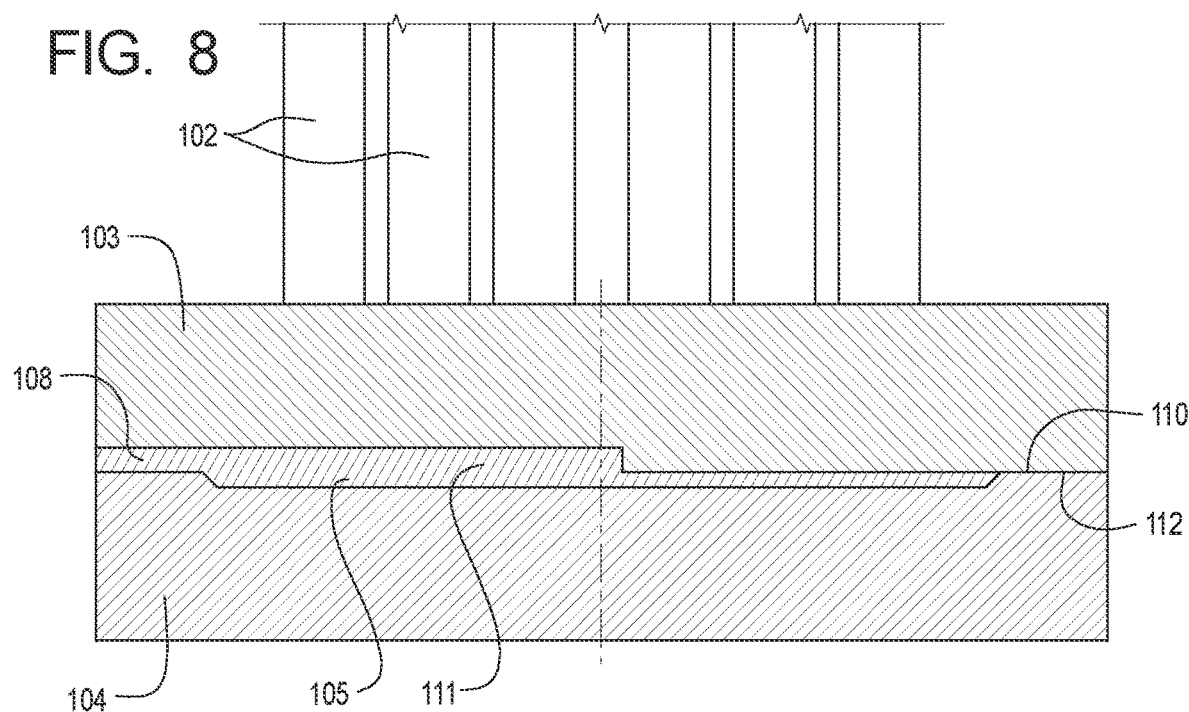

METHOD OF HEAT EXCHANGER ASSEMBLY

This application claims the benefit of U.S. Provisional Patent Application No. 63/256,635, filed Oct. 18, 2021, which is incorporated by reference herein in its entirety.

FIELD OF THE INVENTION

A method of attaching the tubes to the tube sheets in a shell and tube heat exchanger.

BACKGROUND

A shell and tube heat exchanger has U-shaped tubes that pass through a number of tube-sheets. The joint between the tubes and tube-sheets must be sealed to prevent leakage. The current process to attach the tube to the tube sheet is to mechanically expand the tube and seal weld the end. Bio Processing Equipment Standards (BPE) require that if a tube joint fails it should leak to atmosphere instead of cross contaminating the fluids. Tube joints are typically welded with stainless steel material. Stainless steel welds are difficult to perform and are prone to failure in service.

SUMMARY

In view of the foregoing, a method of heat exchanger construction is described herein which provides for an efficient and durable construction, while avoiding the aforementioned disadvantages.

Heat exchanger construction includes inserting a plurality of tubes through corresponding apertures in a first tube sheet and inserting the plurality of tubes through corresponding apertures in a second tube sheet. Next, brazing material is injected into a fill channel in the first tube sheet and then the heat exchanger is heated to a melting temperature of the brazing material.

The tube and shell heat exchanger has a plurality of tubes coupled within apertures in a first tube sheet and apertures in a second tube sheet. Brazing material inserted through a fill channel in the first tube sheet forms a brazed joint between the tubes and tube sheets.

DETAILED DESCRIPTION

Figure 1:
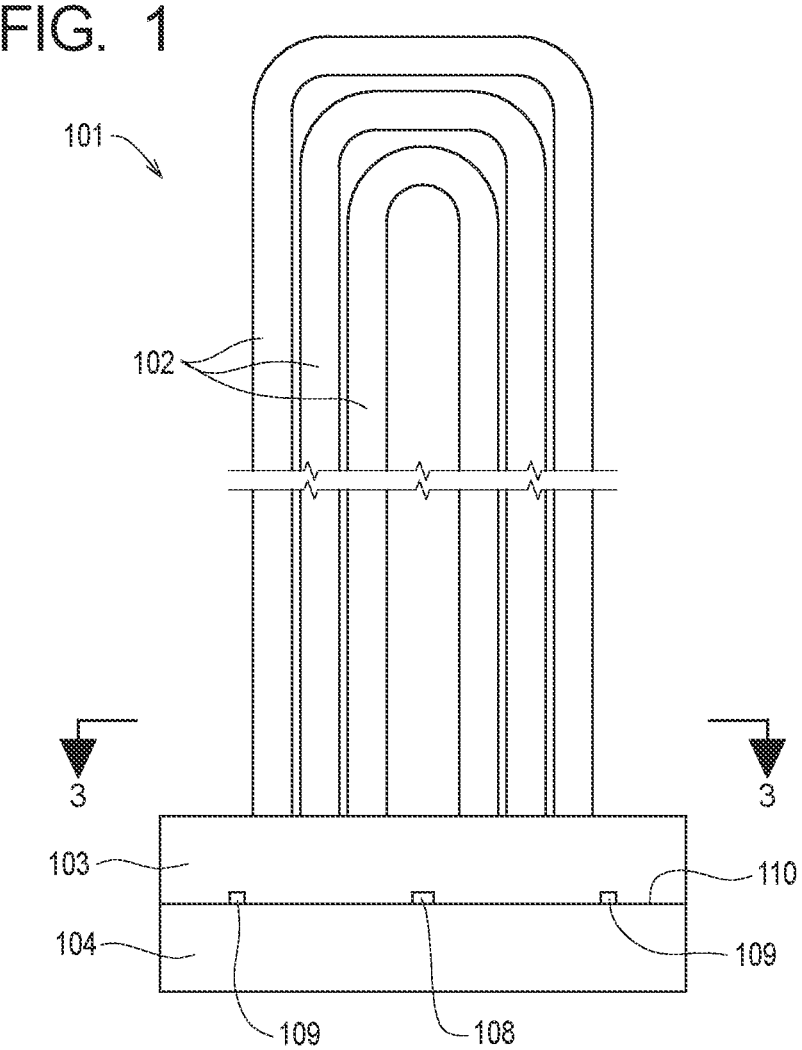
FIG. 1: Side View tube and tube sheet heat exchanger

At least some of the current embodiments solve at least some of the issues in the prior art. One embodiment is a process of nickel brazing the tubes into a tube sheet. An exemplary process for coupling a mated style tube sheet is forming a cavity is between the two tube sheets and filling the cavity with brazing material. When heated to the melting point of the brazing material, capillary action draws the liquid filler metal upwards against gravity and downwards with gravity filling around the tubes. The loss of filler metal creates a void in the cavity for a leak detection path. In one embodiment the process fills the cavity with a dry powder by vibrating the part while a pressurized hopper of dry material forced the brazing material into the cavity. A second embodiment is a method that utilizes pressurized dispenser to inject a water based slurry of brazing material. The part is then placed on a hot surface to evaporate the slurry. The water based method is the preferred embodiment and creates a better void than the dry method.

The tube bundle is prepared and placed in the furnace vertically. The depth of the machined bowl in is calculated using the density of the nickel braze filler metal with the water based carrier and the volume of brazing material needed to fill in around the tubes and between the mating surfaces of the two tube sheets.

In the furnace the filler metal is brought to melting temperature and the liquid nickel filler metal is drawn via capillary action both upwards in the joint between tubes and a first tubesheet and downwards between the tubes and a second tube sheet and also horizontally between the mating surfaces of the two tubesheets. When the part is cooled the bowl is essentially empty of the filler metal and becomes the leak path for fluids to leak to the atmosphere if any joint were to fail on either the first or second tubesheet.

The second tubesheet also comprises a plurality of leak paths in the surface. The leak paths serve as witness paths while filling the machined bowl with brazing material and as leak paths after brazing and the heat exchanger is in use. During manufacture the tubes are oriented in the vertical position and the tubesheets are horizontal and engaged with the tubes. A long leak path is used to pump the nickel braze filler metal into the center of the part which allows the bowl or cavity to be get completely filled with filler metal until it exits the remaining leak paths. The plurality of leak paths are above the cavity because they are machined into the first tube sheet. Therefore, the filler brazing material does not flow out during heating in a furnace. Instead the filler brazing material remains in the cavity to be drawn up and down into the tube joints and horizontally into the first and second tube sheet mating surface by capillary action. Once the brazing material is taken up into the seams and solidifies, the leak paths are open and serve as leak paths for the now empty cavity.

If the fluid going through the tubes were to leak at a failure in the joint at the first tubesheet it would leak to the atmosphere. If the fluid outside the tubes where to leak at a failure in the joint between the tubes and the second tube sheet it would leak to atmosphere. The double tubesheet is required due to the risk of typical welded joint between the tube and tube sheet. The nickel brazed tube to tube sheet joints addresses at least some of the problems inherent in welded or swaged tube to tube sheet joints that often leak and require the double tube sheet leak path.

FIG. 1 shows a tube heat exchanger 101 having a plurality of tubes 102 and a first tube sheet 103 and a second tube sheet 104. The first tube sheet may have a fill channel 108 and leak paths 109 that link the interior portion of the tube sheet to atmosphere. The first and second tube sheet may be coupled at a tube sheet mating surface 110.

Figure 2:
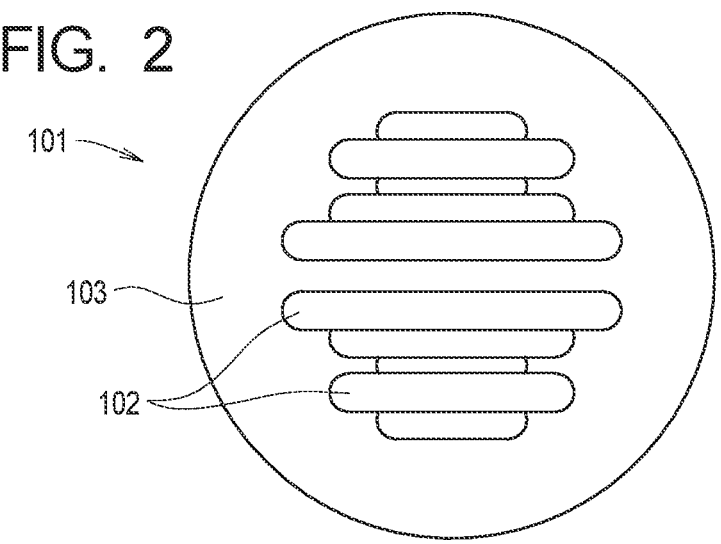
FIG. 2: Top View tube and tube sheet heat exchanger

FIG. 2 is a top view of the tube heat exchanger 101 where the tubes 102 have U-shape and extend perpendicular to the first tube sheet 103.

Figure 3:
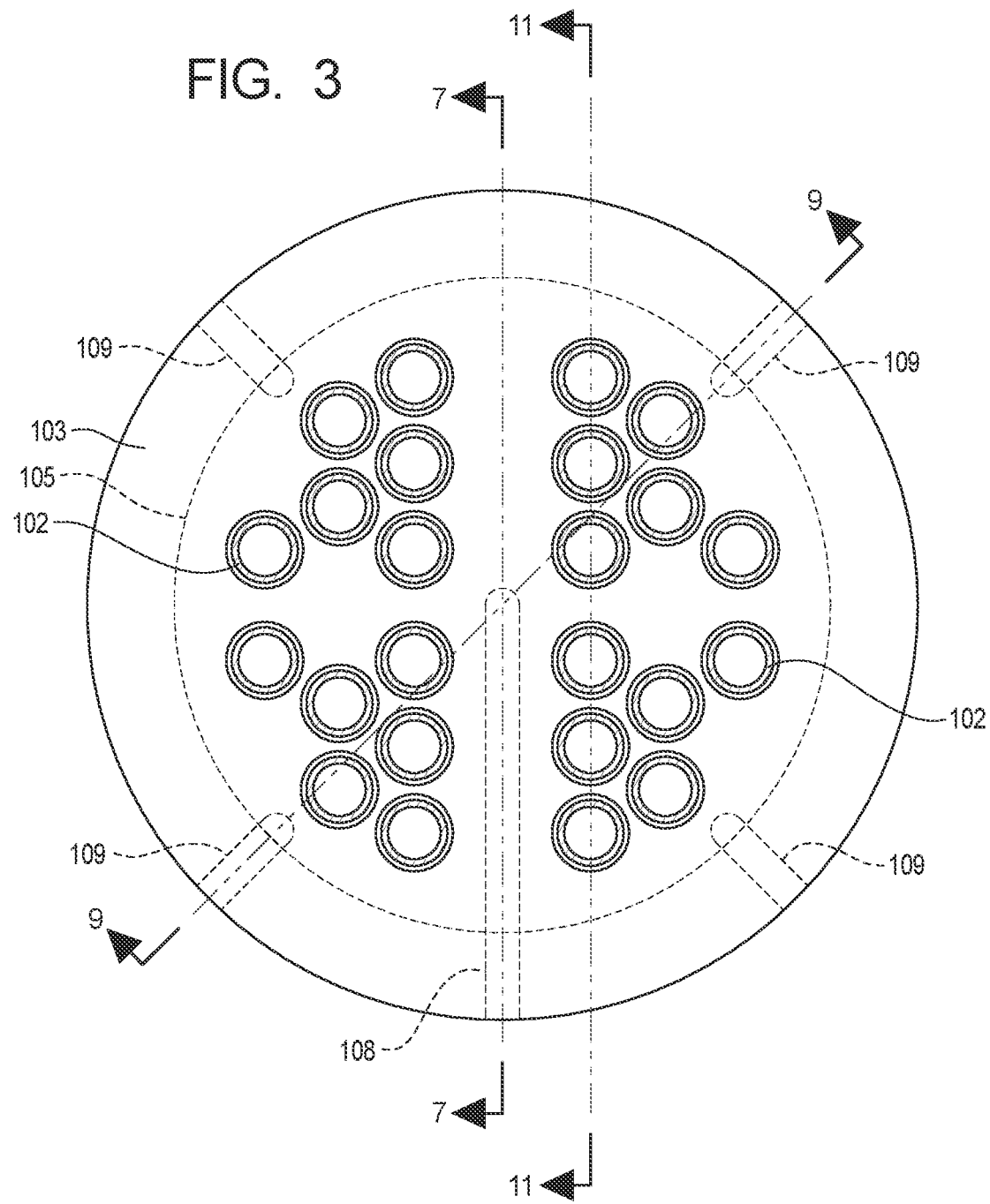
FIG. 3: Section View 3-3 from FIG. 1
FIG. 4: Exploded View of tube and tube sheet heat exchanger

FIG. 3 is a cut view through the tubes 102 looking down on the top surface of the first tube sheet 103. Shown in FIG. 3 are phantom lines showing the outline within the tube sheet of voids and recesses machined into the first and second tube sheet 103, 104. Cavity 105 is in fluid communication with fill channel 108 and leak paths 109.

Figure 4:
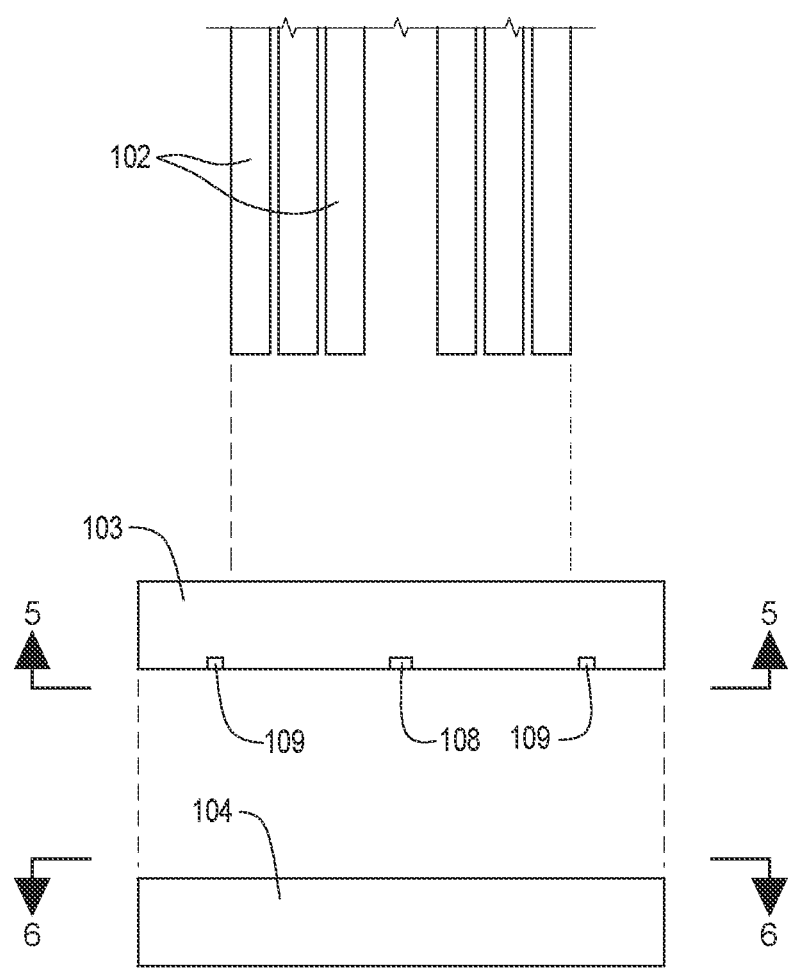
Figure 5:
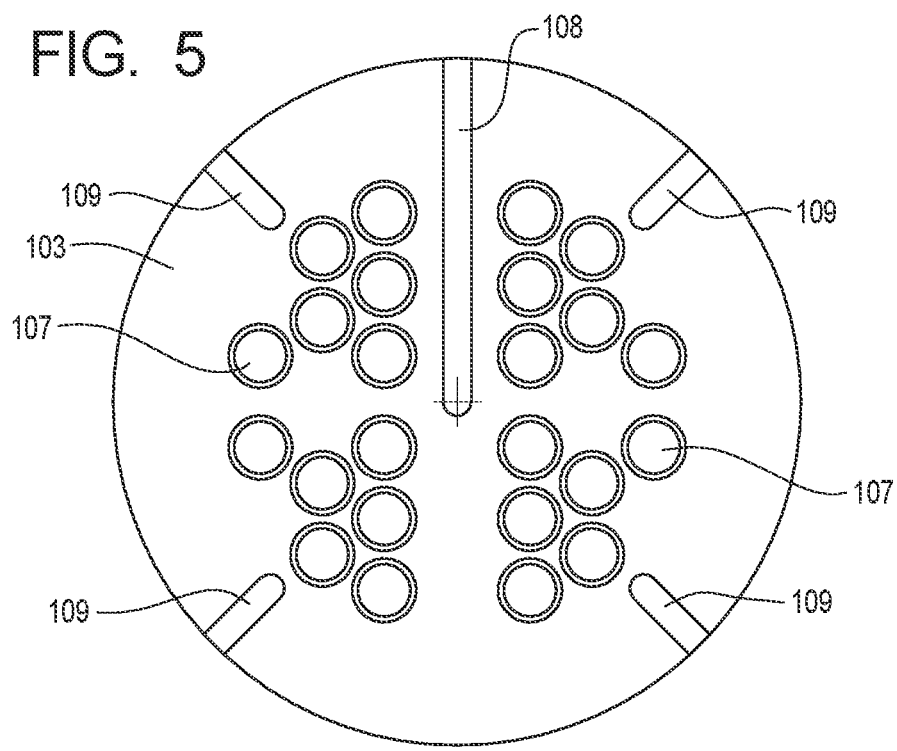
FIG. 5: Section view 5-5 from FIG. 4
FIG. 6: Section view 6-6 from FIG. 4
FIG. 7: Section cut 7-7 from FIG. 3
FIG. 8: Section cut 7-7 having brazing material in the cavity

FIG. 4 is and exploded view showing how the tubes 102 and first and second tube sheet 103, 104 go together. FIG. 5 is taken from FIG. 4 looking at the lower surface of the first tube sheet 103. The fill channel 108 and leak paths 109 are machined into the first tube sheet 103 from the outer edge past the tube sheet mating surface 110.

Figure 6:
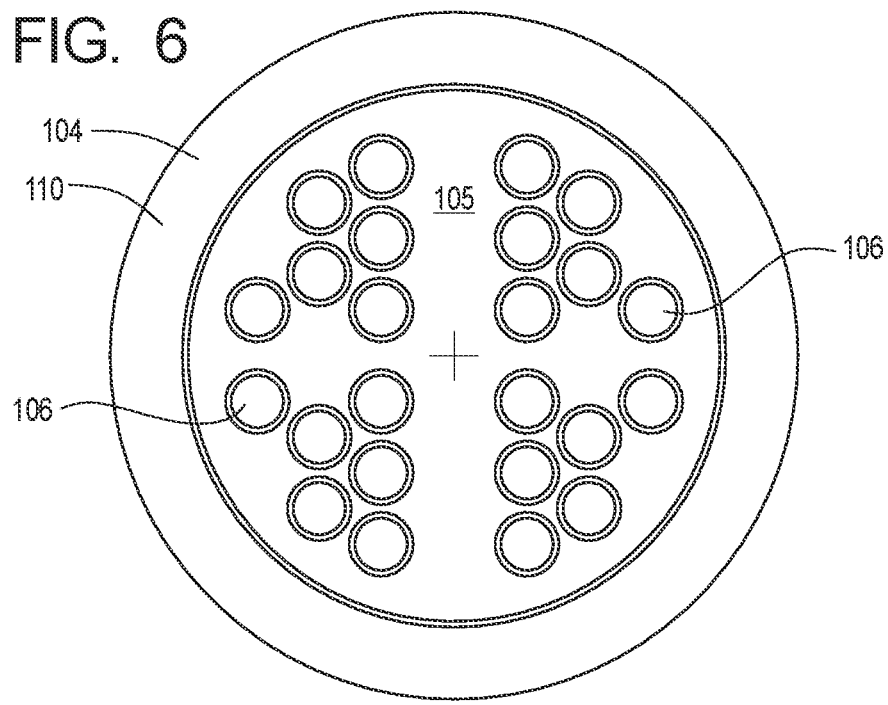

FIG. 6 is taken from FIG. 4 looking down at the upper surface of the second tube sheet 104. Cavity 105 is radially inward from the tube sheet mating surface 110. The edge of the cavity 105 is radially outward of the radially inward edge of the leak paths 109. Apertures 106 extend through the tube sheet and align coaxially with the apertures 107 in the first tube sheet 103.

FIG. 7 is a cut view taken from FIG. 3 through the centerline of fill channel 108. Powdered brazing material 111 moves through the fill channel 108 and into cavity 105. FIG. 8 shows the fill channel 108 and cavity 105 filled completely with powdered brazing material 111. The depth of cavity 105 is determined by the amount of material needed to fill all interfaces needing to be bonded.

Figure 9:
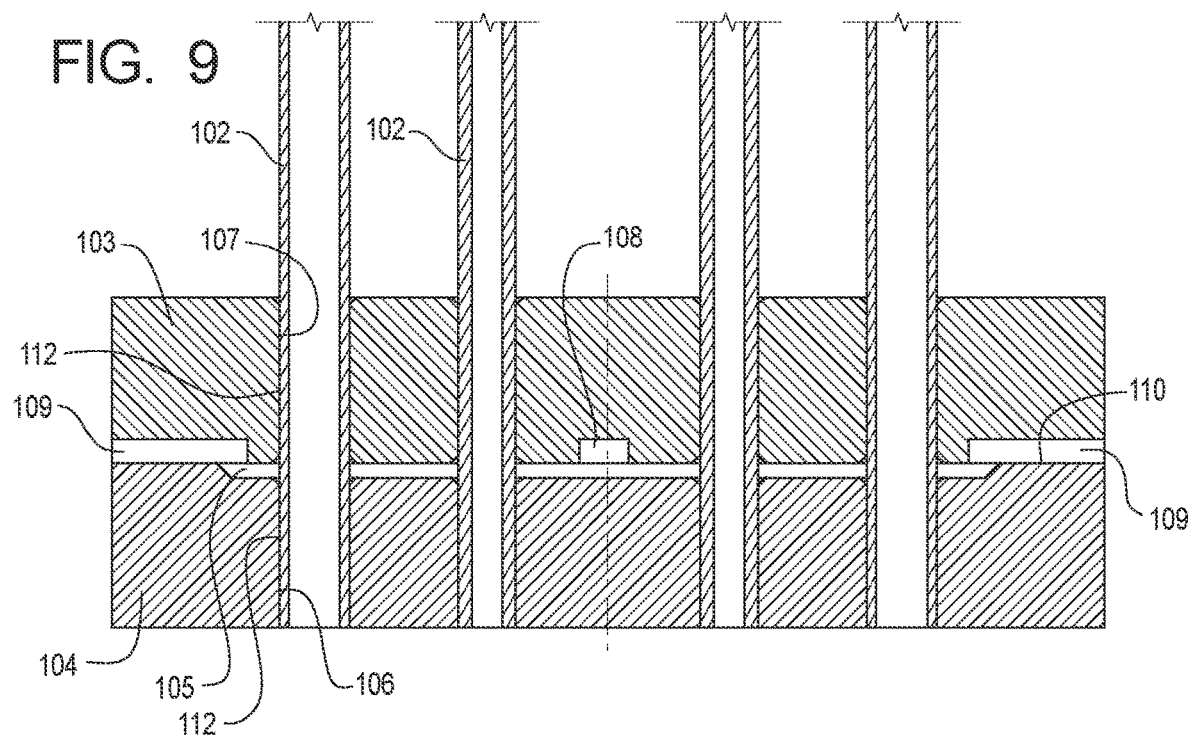
FIG. 9: Section cut 9-9 from FIG. 3
FIG. 10: Section cut 9-9 having brazing material in the cavity
Figure 10:
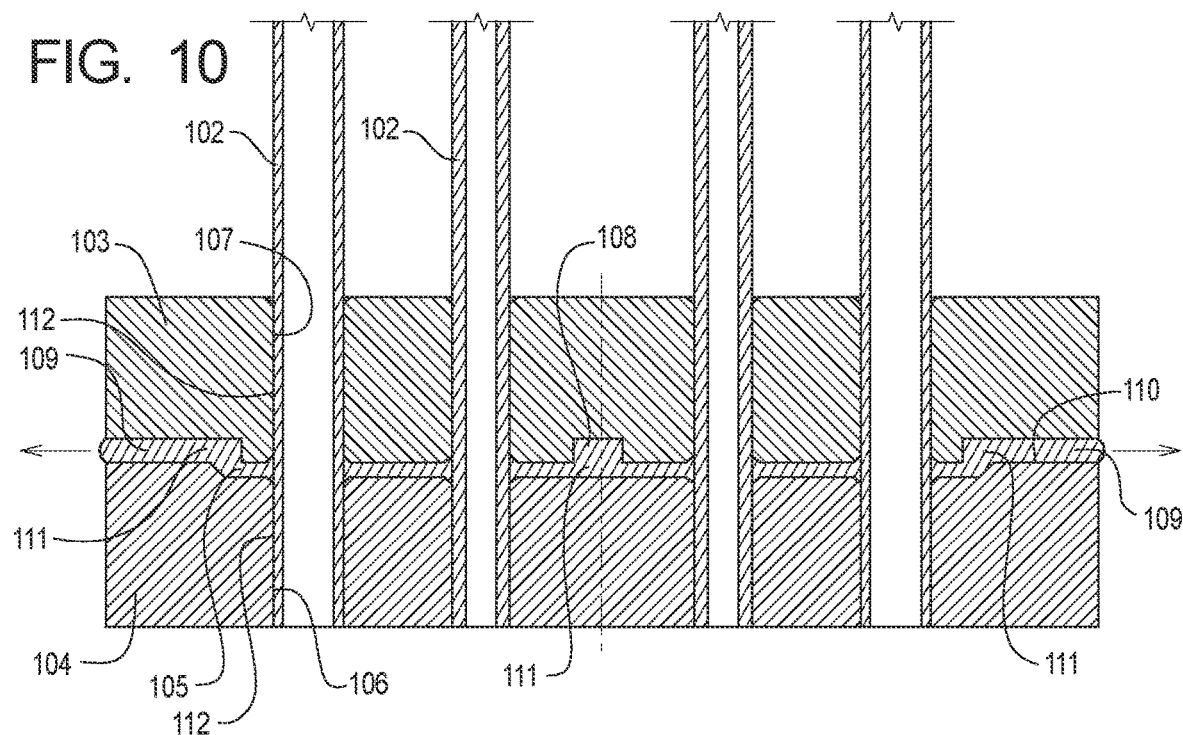

FIG. 9 is a cut view taken from FIG. 3 through the centerline of at least one leak path 109. Leak path 109 extents over the cavity 105 and beyond the edge of the cavity 105. The cavity is also in fluid communication with the tubes 102, apertures through the first tube sheet 107 and apertures through the second tube sheet 106. FIG. 10 shows FIG. 9 once the powdered brazing material 111 has been injected into the cavity 105 and has filled the cavity 105 and exited the leak paths 109.

Figure 11:
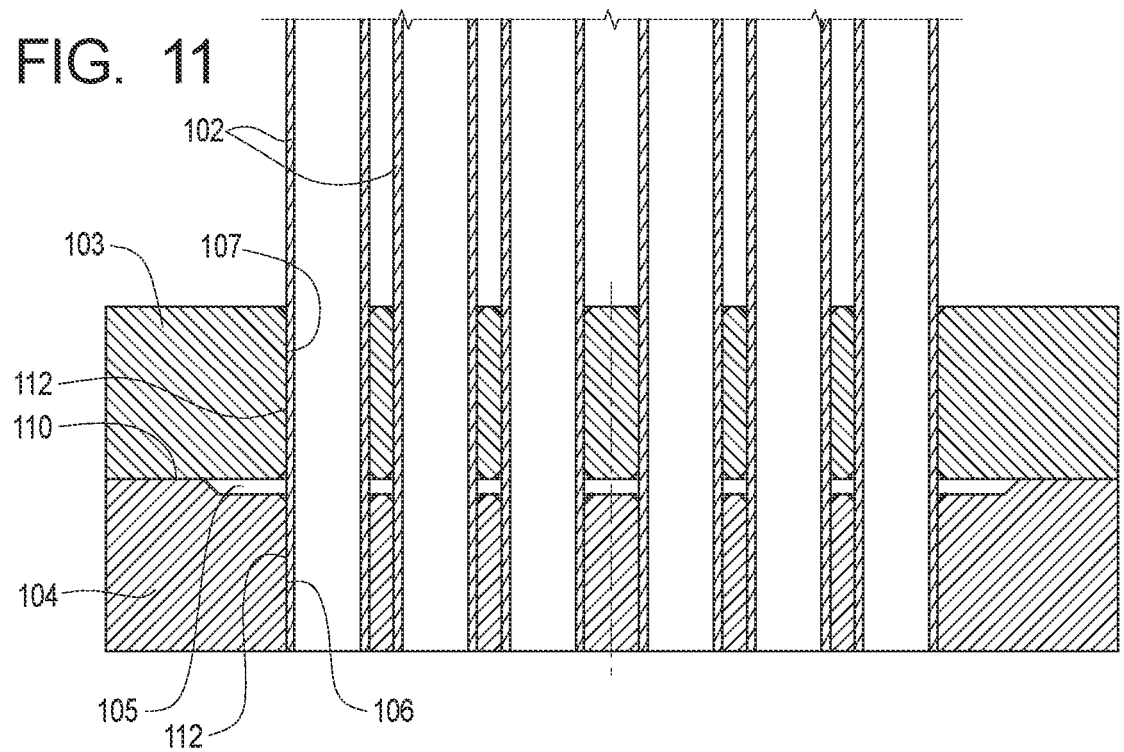
FIG. 11: Section cut 11-11 from FIG. 3
FIG. 12: Section cut 11-11 having brazing material in the cavity
Figure 12:
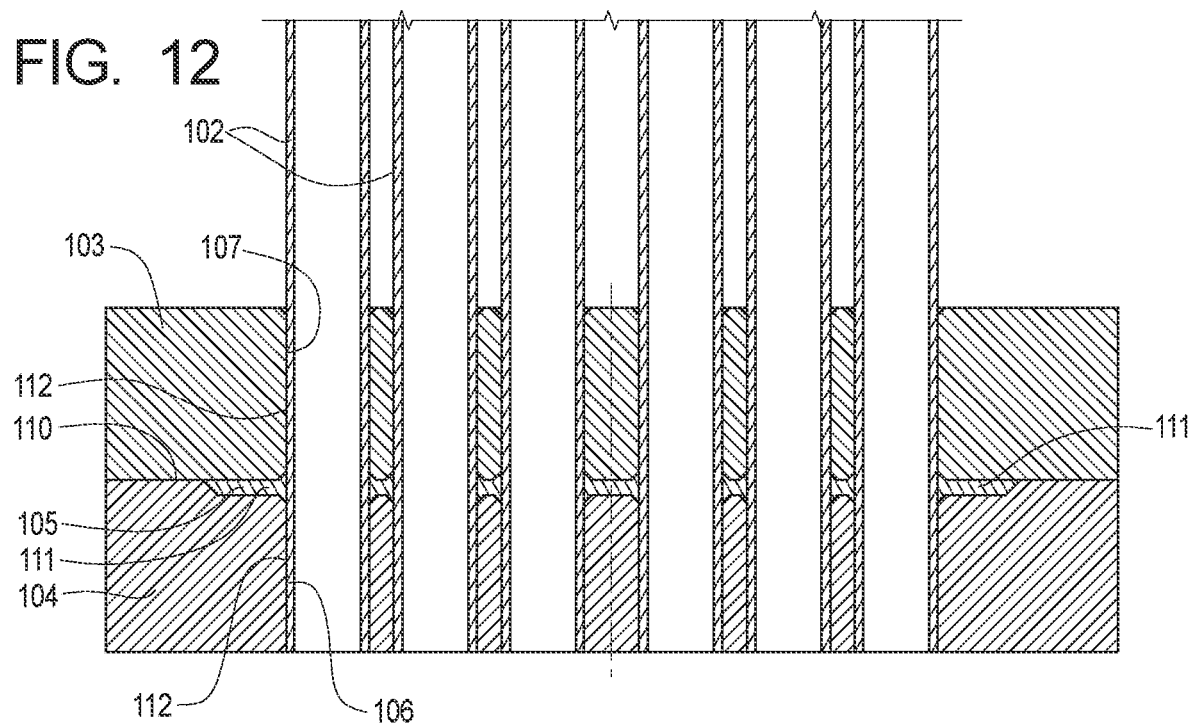

FIG. 11 is cut view taken from FIG. 3 through the centerlines of a row of tubes 102. FIG. 12 shows FIG. 11 with the cavity 105 filled with powdered brazing material 111. The brazing material 111 is in fluid communication with the tube and tube sheet interface 112 in both the first tube sheet 103 and second tube sheet 104. When the heat exchanger is put in a furnace and heated to the powdered brazing material melting temperature, then the liquid brazing material is drawn up and down into the tube and tube sheet interface 112 and drawn into the space between tube sheet mating surfaces 110. Once the liquid brazing material fills the interfaces the cavity 105 is left substantially empty and provides a leak path from any failed joints to leak fluid out the leak paths 109 to atmosphere.

A further embodiment is described as a method for tube heat exchanger 101 construction comprising, inserting a plurality of tubes 102 into apertures 107 in a first tube sheet 103 and then inserting the plurality of tubes 102 into apertures 106 in a second tube sheet 104. Next brazing material 111 is injecting into a fill channel 108 in the first tube sheet 104. The brazing material is has a lower melting point than the stainless steel tubes and tube sheets. Therefore, heating the heat exchanger 101 to a melting temperature of the brazing material allows the molten brazing material 111 to flow through capillary action into joints between tubes 102 and first and second tube sheets 103,104. A cavity 105 is provided in the second tube sheet 104 to allow enough space for the required amount of powdered brazing material 111 that when melted will fill all joints in the heat exchanger. The powdered brazing material 111 may be combined with a fluid such as water, alcohol or acetone to create an even flow of brazing material through fill channel 108 and into cavity 105. The injection of powdered brazing material 111 in to the cavity 105 may also be accomplished with pressurized air and not a fluid or both pressurized air and fluid. The first 103 and second tube sheet 104 may be moved into adjacent contact to allow liquid brazing material 111 to be drawing into the tube sheet mating surface 110 through capillary action. According to the best mode, the first tube sheet 103 has a fill channel 108 and a plurality of leak paths 109 but the second tube sheet 104 may comprise a fill channel 108 or leak paths 109. The plurality of leak paths 109 may be used in witnessing that powdered brazing material 111 has filled the entire cavity 105 during filling. During heating, holding the heat exchanger 101 in a vertical position and in turn the tube sheets 103, 104 in a horizontal position allows molten brazing material to be drawn up into tube and tube sheet interface 112 and into the tube sheet mating surface 110 without dropping out of the leak paths 109 and fill channel 108. The brazing material 111 may be drawn into a space at the interface 112 between the tubes 102 and the first tube sheet 103 or into a space at an interface 112 between the tubes 102 and the second tube sheet 104. The brazing material 111 may also be drawn into a space between the first tube sheet 103 and the second tube sheet 104 wherein, the space between the first tube sheet 103 and the second tube sheet 104 is a mating surface 110 about the perimeter of the tubesheets. The brazing material 111 is moved into all the mating surfaces and leaves the cavity open to atmosphere so leaks in the joints can be seen as they drip out of the leak paths 109.

A tube and shell heat exchanger 101 may comprise a plurality of tubes 102 coupled within apertures 107 in a first tube sheet 103 and the plurality of tubes 102 coupled within apertures 106 in a second tube sheet 104. The joint formed in the interface 112 between the tubes and tube sheets may be a brazed joint. The heat exchanger may further comprise a cavity 105 in the second tube sheet 104 and, a fill channel 108 in the first tube sheet 103 configured for injecting brazing material into the cavity 105. The brazing material may be combined with a fluid carrier such as water alcohol or acetone to produce an even flow of powdered brazing material 111 into fill channel 108. Alternately, pressurized air injects the powdered brazing material 111 into the cavity 105. The heat exchanger 101 utilizes a plurality of leak paths 109 in the first tube sheet 103 configured to witness that brazing material 111 filled the cavity 105. The leak paths are spaced evenly around the circumference of the first tube sheet 103 and when the cavity 105 is filled the leak paths 109 will each flow with powdered brazing material 111. The tube and shell heat exchanger 101 comprises a brazed joint between the plurality of tubes 102 and the first tube sheet 103 and a brazed joint between the plurality of tubes 102 and the second tube sheet 104. Also, the brazed joint formed between the first tube sheet 103 and the second tube sheet 104 forms a mating surface 112 about the perimeter of the tube sheets 103, 104 and a cavity 105 between the first tube sheet 103 and the second tube sheet 104 remains open as a leak path. This leak path 109 is in fluid communication with all brazed joints and the atmosphere so that in the event of a leak, the fluid would leak out rather than contaminate the other fluids in the heat exchanger.

The invention claimed is:

1. A method for heat exchanger construction comprising:
    inserting a plurality of tubes through corresponding apertures in a first tube sheet, inserting the plurality of tubes through corresponding apertures in a second tube sheet, injecting a brazing material combined with a fluid carrier into a fill channel in the first tube sheet, heating the tube sheets to a melting temperature of the brazing material, and evaporating the fluid carrier used to inject and distribute brazing material into the fill channel.

2. The method of claim 1 further comprising:
providing a cavity in the first tube sheet.

3. The method of claim 1 further comprising:
moving the first and second tube sheet into contact.

4. The method of claim 1 further comprising:
witnessing that a liquid brazing material has filled a cavity, through a plurality of leak paths in the first tube sheet.

5. The method of claim 1 further comprising:
positioning the first and second tube sheets to orient a mating surface into a horizontal position during heating in a furnace.

6. The method of claim 1, wherein:
the heating step further comprises:
heating the brazing material until the brazing material is drawn into a space between the first tube sheet and the second tube sheet and leaving a leak path open.

7. The method of claim 6 wherein,
the space between the first tube sheet and the second tube sheet is a mating surface about a perimeter of the first and second tube sheets.

8. A method for heat exchanger construction comprising:
inserting a plurality of tubes through corresponding apertures in a first tube sheet, inserting the plurality of tubes through corresponding apertures in a second tube sheet, injecting a brazing material into a fill channel in the first tube sheet, heating the tube sheets to a melting temperature of the brazing material, and evaporating a fluid carrier used to inject and distribute brazing material into the fill channel, and heating the brazing material until the brazing material is drawn into a space between the first tube sheet and the second tube sheet and leaving a leak path open.

9. The method of claim 8 further comprising:
providing a cavity in the first tube sheet.

10. The method of claim 8 further comprising:
moving the first and second tube sheet into contact.

11. The method of claim 8 further comprising:
witnessing that a liquid brazing material has filled a cavity, through a plurality of leak paths in the first tube sheet.

12. The method of claim 8 wherein,
the space between the first tube sheet and the second tube sheet is a mating surface about a perimeter of the first and second tube sheets.

\* \* \* \* \*